United States Patent [19]

Ino et al.

[11] 4,026,258

[45] May 31, 1977

[54] CONTROL DEVICE FOR REGULATING THE AMOUNT OF COLLECTED FUEL AND/OR OIL VAPORS WHICH ARE DELIVERED TO THE COMBUSTION CHAMBER OF AN INTERNAL COMBUSTION

[75] Inventors: Takao Ino; Takeo Shimizu; Hiroaki Ono, all of Kyoto, Japan

[73] Assignee: Mitsubishi Jidosha Kogyo Kabushiki Kaisha, Japan

[22] Filed: Feb. 24, 1975

[21] Appl. No.: 552,218

Related U.S. Application Data

[63] Continuation of Ser. No. 399,191, Sept. 20, 1973, abandoned, which is a continuation of Ser. No. 198,778, Nov. 15, 1971, abandoned, which is a continuation of Ser. No. 6,173, Jan. 27, 1970, abandoned.

[30] Foreign Application Priority Data

Feb. 10, 1969 Japan ................................ 44-9258

[52] U.S. Cl. .................................. 123/136; 123/120
[51] Int. Cl.² ........................................ F02M 59/00
[58] Field of Search ................................... 123/136

[56] References Cited

UNITED STATES PATENTS

| | | |
|---|---|---|
| 3,001,519 | 9/1961 | Dietrich et al. ............... 123/136 |
| 3,370,578 | 2/1968 | Spelts ............................ 123/136 |
| 3,460,522 | 8/1969 | Kittler et al. .................. 123/136 |
| 3,645,244 | 2/1972 | Seyfarth ........................ 123/136 |
| 3,759,234 | 9/1973 | Buckton et al. .............. 123/136 |

*Primary Examiner*—C. J. Husar
*Assistant Examiner*—Paul Devinsky
*Attorney, Agent, or Firm*—McGlew and Tuttle

[57] ABSTRACT

A control device for regulating the amount of collected fuel and purge air which is delivered to the combustion chamber of an internal combustion engine in addition to its usual mixture of combustion air and fuel includes a valve element which is connected for operation in accordance with the pressure conditions of the fuel intake pipe and carburetor of the internal combustion engine to provide a flow rate of the collected fuel and purge air which is proportional to the flow rate of the usual fuel and air mixture. The device includes a valve body having a diaphragm dividing the interior and which carries a needle valve on one side which is adapted to seat in a valve seat of a line connected to the engine inlet. This same side of the diaphragm is also connected to a line which is adapted to receive accumulated or collected vapors, for example, from the fuel tank or the crank case. The opposite side of the diaphragm is biased by a spring to provide an initial closing action on the needle valve but this biasing force may be overcome by the negative pressure which is conducted to this portion of the body chamber by a sensing line which is adapted to be connected to the carburetor at the location of the venturi.

3 Claims, 9 Drawing Figures

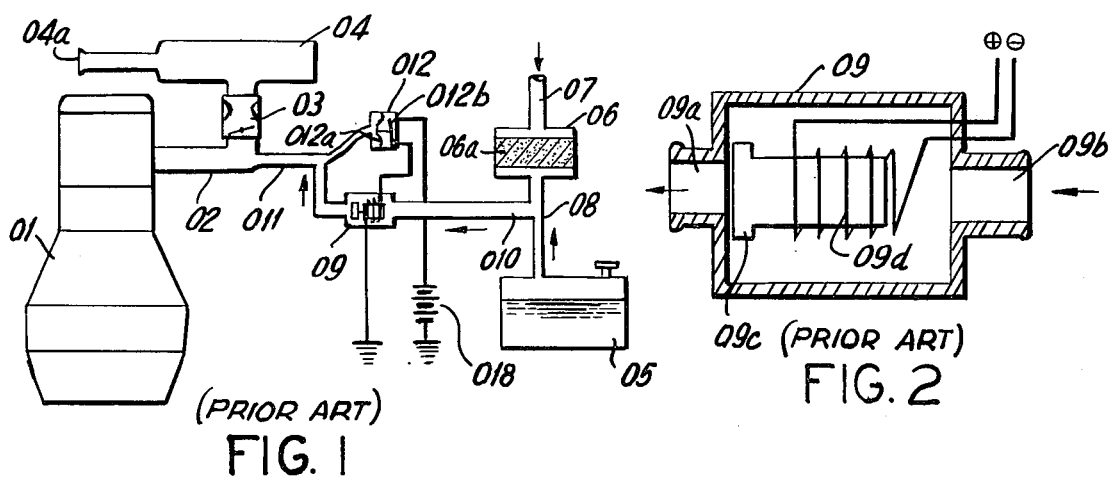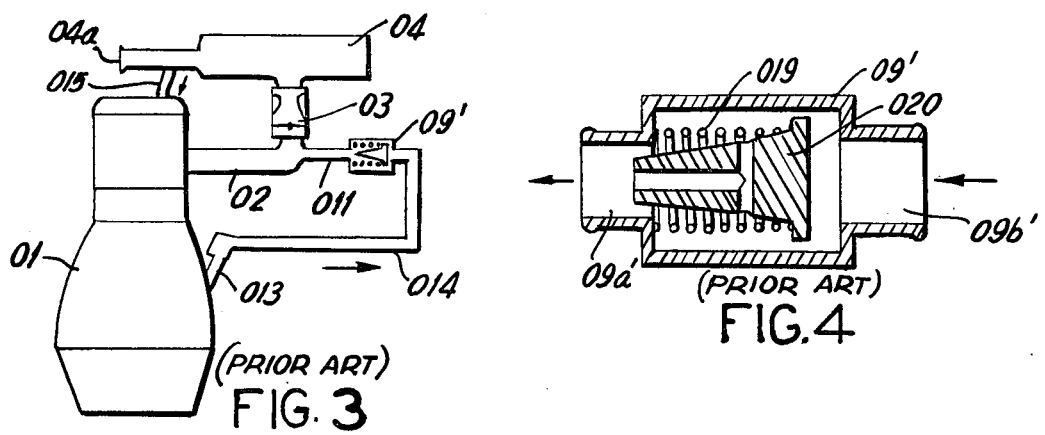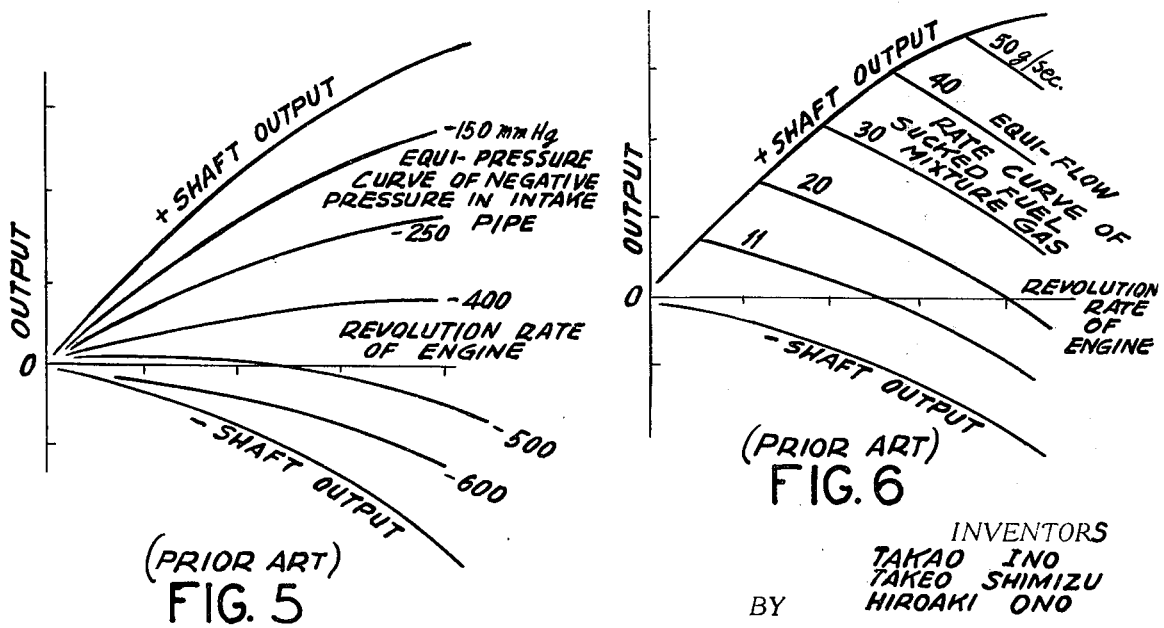

4,026,258

CONTROL DEVICE FOR REGULATING THE AMOUNT OF COLLECTED FUEL AND/OR OIL VAPORS WHICH ARE DELIVERED TO THE COMBUSTION CHAMBER OF AN INTERNAL COMBUSTION

This is a continuation of application Ser. No. 399,191, filed Sept. 20, 1973, now abandoned, which is a streamlined continuation of application Ser. No. 198,778, filed Nov. 15, 1971, now abandoned, which is a continuation of Ser. No. 6,173, filed Jan. 27, 1970, now abandoned.

SUMMARY OF THE INVENTION

This invention relates in general to internal combustion engine operating control devices and in particular to a new and useful device for regulating the amount of flow of the mixture which consists of purge air and accumulated vapors from the fuel systems of an internal combustion engine to the inlet of such engines.

At the present time devices are known for connecting the float chamber of a carburetor and the fuel tank to one or more containers having a material which is capable of absorbing the fuel particularly during the stoppage of the engine and this material is regenerated by the passage of fresh air (purge air) thereover and by the delivery of the absorbed fuel and air mixture to the engine for combustion therein. Since all of the known devices function to introduce gases other than a fuel mixture, of a fuel such as gasoline and air, into the intake pipe of an engine, it is required that the variations of air fuel ratio of the total fuel and gas mixture which is delivered to the engine be controlled so that the engine operation will not be irregular and that there will be no loss of power. It has been suggested by the prior art that control devices be employed for controlling the amount of additional or supplemental fuel (accumulated fuel) and air (purge air) which is to be introduced into the combustion chamber along with the usual fuel and air mixture. A basic disadvantage of the known devices, however, is that they do not permit uniform combustion conditions of total mixture and even combustion engine operation but they operate such that there is an uneven air fuel ratio of the total mixture so that engine operation becomes very rough. Because the amount of purge air is much larger than that of the accumulated fuel, the induction of the mixture by known devices leads to uneven air fuel ratio of total mixture into the combustion chamber, and engine operation becomes very rough.

Accordingly, it is an object of the invention to provide an improved device for regulating the amount of additional air (purge air) and fuel (accumulated fuel) mixture which is delivered to an inlet of an internal combustion engine, in accordance with the amount of usual fuel and air mixture. That is, the amount of additional air is proportional to that of the usual mixture, so the air fuel ratio of the total mixture is always a constant value, and drivability is never reduced by the introduction of the air.

A further object of the invention is to provide an internal combustion engine with a device that directs additional air and fuel (the amount of the fuel is very litle in comparison with the air) into the inlet of the engine in a quantity which is proportional to the usual induction air and fuel of the engine during any period of its operation and which advantageously includes a valve member having a movable diaphragm which is displaceable in accordance with the sensed pressure conditions at the venturi of a carburetor and also further downstream at the inlet to the engine for the purpose of opening and closing a valve member connected between a supply of purge air and vaporized fuel and the inlet to the engine.

A further object of the invention is to provide a control device for admixing a burnable fuel mixture to the inlet of an engine in accordance with the total amount of mixture which is delivered by a carburetor.

A further object of the invention is to provide a valve device for controlling admission of air and fuel to an internal combustion engine which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated a preferred embodiment of the invention.

BRIEF DESCRIPTION OF THE DRAWINGS

In the drawings:

FIG. 1 is a schematic side elevational view partly in section of a fuel evaporation control device for an automobile constructed in accordance with the prior art;

FIG. 2 is an enlarged axial sectional view of the control device of the prior art for the system indicated in FIG. 1;

FIG. 3 is a view similar to FIG. 1 of another embodiment of prior art device;

FIG. 4 is an enlarged view similar to FIG. 2 of another embodiment of prior art control device;

FIG. 5 and FIG. 6 are diagrammatic views showing curves of revolution rate versus output of a gasoline engine of the prior art;

PRIOR ART

Figure 7:
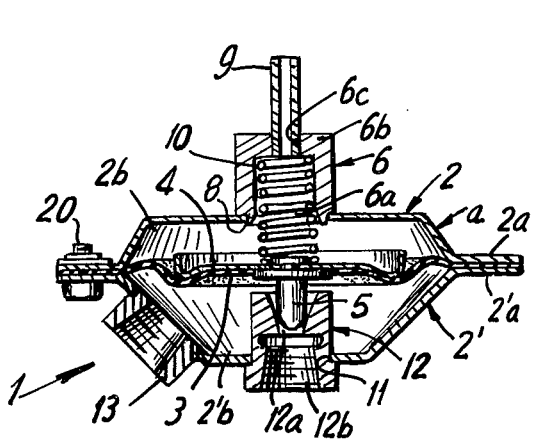
FIG. 7 is an enlarged sectional view of a control device constructed in accordance with the invention.

Referring to FIGS. 1 to 5, there are shown prior art devices and performance curves (FIG. 5 and FIG. 6) for devices which permit the delivery of an admixture of additional fuel and air, which has been obtained by recovering vapors from one or more areas of accumulation such as a fuel rank, a carburetor, float chamber, etc., to the engine intake in order to permit combustion thereof along with the regular fuel and air mixture delivered to the engine.

A prior art system for recovering vapors which accumulate in an internal combustion engine fuel system is indicated in FIG. 1 and a modification of this system to provide for collection and subsequent combustion of the vapors of a crank case is indicated in FIG. 3. An internal combustion engine 01 is provided with an intake 02 connected with the discharge end of a carburetor 03 which has its intake end covered by an air cleaner 04 having an air inlet 04a. In this system, a vent line 08 is connected from the fuel tank 05 to an absorption tank 06 having an absorption material 06a, such as activated carbon, for absorbing the fuel products from the vapors of the gas tank. An air intake 07 is connected to the absorption tank 06 and there is a cross connection 010 extending from both the absorption tank 06 and the fuel tank 05 to a conduit 011 which connects into the intake 02 downstream of the carburetor 03. The cross line 010 contains an electromagnetic valve 09 for regulating the flow through the cross conduit 010 to the conduit 011 which is connected to the intake 02.

As best indicated in FIG. 2, the valve 09 includes an inlet opening 09b at one end and an outlet opening 09a which provides a discharge of the accumulated or additional fuel-vapor-air gases of the fuel system to the conduit 011.

In the systems of the prior art a vacuum switch 012 (FIG. 1) is connected to a power source 018 and in an electrical circuit to a coil 09d (FIG. 2) which may be energized to cause movement of a valve member 09c in the valve 09. The vacuum switch 012 includes a flexible diagram 012a for actuating a control switch 012b in accordance with the vacuum pressure conditions acting on the intake 02 and communicated through the lines 011 to the vacuum switch 012. Therefore, the vacuum switch 012 is actuated in response to the variation of the negative pressure within the intake 02 in accordance with the running of the engine 01. In accordance with the opening and closing of the vacuum switch 012 the electromagnetic valve 09 is regulated. In operation, if the negative pressure within the intake 02 is larger than a predetermined value, the valve 09 is closed to block the suction of the additional fuel and/or fuel and air coming through the conduit 010.

In the operation of the prior art device, indicated in FIG. 1, if the negative pressure within the intake 02 is larger than a predetermined value, the valve 09 is closed by the movement of the armature 09c to the left to block the outlet 09a. However, the pressure range of operation where the electromagnetic valve 09 is opened, the suction rate of the fuel and air through the line 010 will vary in proportion to the magnitude of the negative pressure within the intake pipe 02, and as shown by the curve of revolution rate vs. output as indicated in FIG. 5.

In the modification indicated in FIG. 3, the engine 01 includes a crank case breather line as 013 which is connected through a conduit 014 to a control valve 09' which, for example, may also be arranged to connect into the conduit 011 leading to the intake 02 as in the showing of FIG. 1. In this construction, the valve 09' may have the construction indicated in detail in FIG. 4 which includes a spring 019 which is arranged to bias a valve member 020 off its seat in the discharge conduit 09a'. A ventilating air intake 015 is also provided from the crank case to the inlet 04a to the air cleaner 04. The valve member 020 is displaced either to the left to close the seat or to the right to fully open the seat so there is full flow from the inlet 09b' to the outlet 09a'. Upon increased negative pressure within the intake pipe 02 the control element 020 may move leftwardly to choke the path of flow of the gas and upon a decreased negative pressure within the intake 02 the valve body 020 will move rightwardly to permit full flow of the fuel or gas mixture therethrough. Therefore, the suction rate of the collected gas vapor and air mixture through the conduit 010 to the conduit 011 and to the intake 02 will be in inverse proportion to the magnitude of the negative pressure within the intake pipe 02 as indicated in the curves of FIG. 5. However, since the suction rate of the fuel mixture 40 in ordinary engine operation follows the curve shown in FIG. 6 with either one or both of the devices as indicated in FIGS. 1 and 3 respectively to proportion the fuel mixture passing through the carburetor, any additional gas sucked through the conduit 011 will always vary with variation of the revolution rate of the engine and the load upon the engine and, therefore, the final fuel ratio of the resultant mixture which is supplied into the engine cylinders will vary. With the prior art devices therefore, it cannot be said that there is a satisfactory control of the additional gas and air mixture delivered through the conduit 011 to the intake 02.

GENERAL DESCRIPTION OF THE PREFERRED EMBODIMENT

Figure 8:
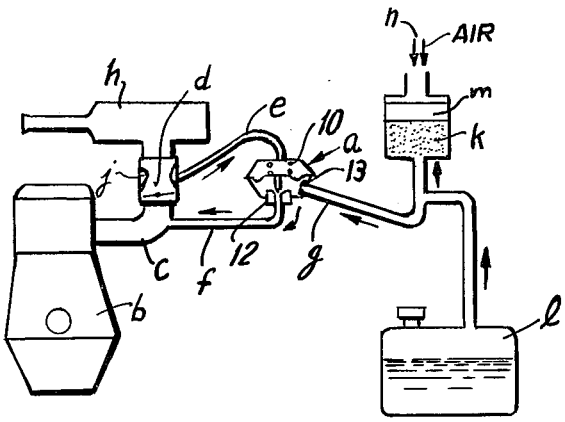
FIG. 8 is a diagrammatic view similar to FIG. 1 showing a system incorporating the device of the invention.
Figure 9:
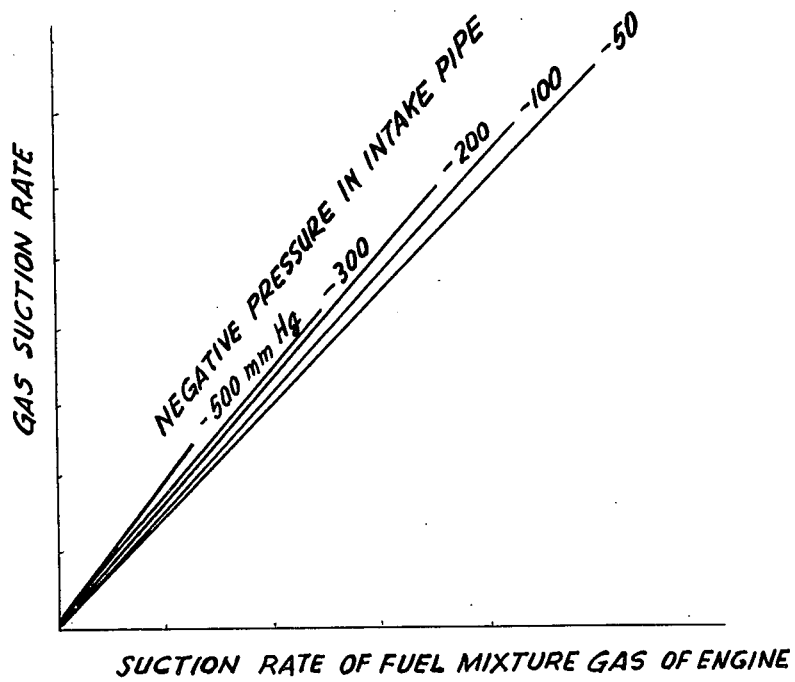
FIG. 9 is a diagrammatic view indicating a curve of the negative pressure in the intake pipe of an internal combustion engine as it varies in accordance with additional fuel-vapor-air suction rate and the suction rate of the usual fuel mixture of the engine.

The invention as embodied and described in respect to a particular control is indicated in FIG. 7 and the system in which the control is operated is indicated in FIG. 8 and described in respect to FIG. 9. The inventive device includes control means in the form of a valve assembly generally designated a and having upper and lower cup shaped housing parts 2 and 2' with flanges 2a and 2'a which fit together in an airtight manner and are secured by means of suitable securing elements such as clamping bolts 20. A diaphragm 3 is held between the flanges and divides the interior of the control valve assembly into upper and lower chambers 2b and 2'b respectively. A shaping member 4 is affixed to the top surface of the diaphragm 3 and it, together with the diaphragm, provides a mounting for a needle valve 5 which extends downwardly into the lower chamber 2'b and includes an axis which is aligned with the center of the diaphragm 3 within the housing generally designated 1 which is formed by the cup parts 2 and 2'.

A cylindrical extension 6 is formed on the part 2 and it provides a fitting for a vacuum connection 9 which is adapted to be connected to the venturi of a carburetor d as indicated in FIG. 8. For this purpose the cylindrical extension 6 includes an opening 6a at one of which is large enough to accommodate a coil spring 10 which provides a biasing of the diaphragm 3 in a downward direction. An opposite wall 6b is provided with an opening 6c for communicating with the conduit 9. The spring 10 maintains the diaphragm 3 at a predetermined position and urges the needle valve 5 to engage on a valve seat member generally designated 12 which is fitted centrally to the lower cup part 2'. The seat member 12 is fitted within a bore 11 of the lower part 2' in an air-tight manner and the seat includes a jet portion 12a formed as a venturi and forming a seat for the needle valve 5. The valve seat member 12 also defines an outlet passage 12b which is adapted to be connected to the intake c of the engine b in the system indicated in FIG. 8. The connection of the intake c is through a conduit f to the seat member 12. The connection of the vacuum line 9 is through a conduit e to the venturi section or throat section j of the carburetor d.

The control means a also includes a gas or fuel and air mixture inlet fitting 13 which is connected to the lower part 2' and which provides a connection for a conduit g which, for example, may be connected at its opposite end to an absorption unit k or directly to a fuel tank l. The absorption unit k advantageously includes an absorption material m such as activated carbon which may be regenerated during some portion of the operating cycle, for example, for admitting fresh air through a conduit n.

In operation of the system indicated in FIG. 8, when the engine b begins running and the rate of fuel and air mixture which is delivered as combustion air to the carburetor d through the inlet of the air cleaner h and as fuel by admission of the fuel from the flow chamber to the venturi section j is increased, the negative pressure generated in the venturi portion j of the carburetor d will also increase gradually. This negative pressure acts upon the diaphragm 3 of the control means a through the communication established through the conduit e. This causes the diaphragm 3 to be displaced upwardly against the biasing force of the spring 10 to move the needle valve 5 upwardly in the venturi portion 12a of the valve seat 12 to permit a greater flow of additional fuel, fuel vapor and/or fuel vapor and air mixture through the conduit f to the intake c. Therefore, by suitable design of the needle valve 5, the throat or venturi section 12a, the diaphragm 3 and the spring 10, and if the negative pressure in the intake c is kept constant the flow rate of the additional gas or fuel and air mixture into the intake c through the line g and the control means a can be increased in proportion to the suction rate of the fuel and gas mixture for the ordinary operation of the engine b.

With the decribed construction involving the inlet 13 connected through the line or conduit g, engaged therein, and the absorbent material k to the atmosphere, and involving the valve element 12 connected to the line f to the intake pipe c, the pressure acting in the second or lower chamber 2'b is the algebraic sum of the substantially atmospheric pressure at the connection 13, reduced somewhat by the flow resistance through the absorbent material k and the negative pressure at the engine intake line c. As the flow area through the connection 13, even though reduced by the insertion of the conduit g inserted therein, is somewhat greater than the flow area through the venturi section 12a, the pressure in the second or lower chamber 2'b will approach atmospheric pressure reduced somewhat by the negative pressure in the engine intake line c.

The negative pressure of the intake line c through the conduit f is effective, through the venturi 12a on the effective cross-sectional area of the valve element 5. If the effective cross-sectional area of the valve element 5, that is, the area effective in controlling flow through the venturi section 12a, is indicated by A, and if the negative pressure effective at the venturi 12a, and proportional to the negative pressure in the intake manifold or pipe c, is taken as P, the effective negative pressure acting to move the diaphragm 3 downwardly in opposition to the substantially atmospheric pressure effective through the conduit g and the connection 13, is PA.

With the engine idle or with the engine shut off, only atmospheric pressure is present in the lower chamber 2'b. However, as the engine is accelerated, the vacuum or negative pressure in the intake manifold or pipe c increases. As the effective atmospheric pressure at the opening of connection 13 into the lower chamber remains substantially constant, the pressure in the lower or second chamber 2'b thus will vary in a negative direction with an increase in the negative pressure of the intake pipe c, and will vary in a positive direction with a decrease in the negative pressure in the intake pipe c. The effective positive pressure in the lower chamber 2'b acting to move the diaphragm 3 upwardly thus varies between atmospheric pressure and a pressure somewhat less than atmospheric pressure in dependence on variations in the negative pressure in the intake pipe c.

The movement of the diaphragm 3 is also influenced by the negative pressure in the venturi section of the carburetor b above the throttle valve, and this pressure is effective in the upper chamber 2b above diaphragm 3. Thus, with the atmospheric pressure at the inlet of connection 13 into the lower chamber 2'b remaining substantially constant, the movement of the diaphragm 3, and thus of valve 5 controlling the effective flow area through venturi 12a is essentially a function of the difference between the negative pressure in the venturi section of the carburetor d and the negative pressure in the intake pipe or manifold c, as exerted through the venturi 12a on the effective cross-sectional area of the valve 5. Thus, when the throttle valve or the carburetor d is fully opened, with the suction rate of the fuel and gas mixture fed through the carburetor greatly increasing but with the negative pressure within the intake pipe c remaining constant, the diaphragm 3 and the valve element 5 will move upwardly increasing the effective flow area for the purge air through the venturi 12a.

Thus, when the suction rate of the fuel and gas mixture which is fed through the carburetor d is kept constant but the negative pressure within the intake pipe c is increased, the negative pressure acting on the upper side of the diaphragm 3 will remain constant but the negative pressure of the intake pipe c acting upon the lower side of the diaphragm 3 will increase. The net result will be a decrease in the pressure tending to move the diaphragm 3 and the valve element 5 upwardly, so that the now constant negative pressure in the upper chamber 2b as counterbalanced by the force of the spring 10 will end to move the diaphragm 3 downwardly thus tending to move the valve element 5 further into the opening 12a to seat in this opening. Consequently, flow path between the valve 5 and the venturi throat section 12a of the valve seat will be choked to lessen the flow of the additional gases or fuel and/or fuel air mixture through the conduit f to the intake c. By appropriately selecting the design of the needle valve 5 and the venturi throat section 12a, and diameter and stiffness of the diaphragm 3, as well as biasing force of the resilient member or spring 10, it is possible to keep the suction rate of the gas nearly constant regardless of the increase of the negative pressure within the intake c and provided that the suction rate of the fresh fuel and air mixture fed to the engine through the carburetor d remains constant.

The control means a of the invention can control the suction rate of the additional fuel and air mixture or vapors to the intake c from the line f throughout the various running stages of the engine as illustrated in FIGS. 5 and 6 so that the air-to-fuel ratio will not change substantially under any running state of the engine, except for running with a wide open throttle and thus the performance of the engine and the smoothness of operation of the engine and the associated vehicle will be improved. With the construction of the invention a steady and even operation of the engine can be assured and in addition, the fuel which is collected in the absorption tank may be readily used during normal operation so that the volume of such a tank may be reduced in comparison to that of the prior art. This reduction in volume naturally reduces the cost for the apparatus and the necessary space for accommodating the various parts. The control means of the present invention is very simple to construct and to operate and maintained.

In FIG. 9, experimental results obtained by actually testing and measuring the flow rates through the control means $a$ in the system indicated in FIG. 8 are shown. The abscissa of the graph indicated in FIG. 9 shows the flow rate of its normal fuel and air mixture for the engine which passes through the carburetor $d$ while the ordinate indicates the flow rate of the added fuel and air or gas mixture which flows through the conduit to the intake $c$. In addition, when measuring the rate of flow through the carburetor by the normal fuel and air mixture supplied to the engine and the flow rate of the additional mixture supplied through the conduit $f$, it is seen that the resultant curves are straight lines. This proves that the suction rate through the conduit $f$ to the intake $c$ is determined only by the flow rate of the fresh fuel and air mixture which is delivered through the carburetor $d$ regardless of the negative pressure within the intake pipe 2 and also that the respective rates are substantially proportional to each other. Therefore, it is seen that by means of the control means $a$ and the arrangement of the system according to the invention, the air-to-fuel ratio of the final total fuel mixture which is delivered through the intake $c$ to the engine $b$ will not be varied by the suction rate of the fresh fuel and gas mixture at the carburetor.

Although the embodiments described are in relation to a gasoline engine, it is also possible that the device may be applied to other types of engines such as a gas engine.

In some instances it might be preferable to employ bellows instead of the movable diaphragm and in such instances link means for appropriately regulating the aperture cross-section of the orifice may be provided.

What is claimed is:

1. An apparatus for regulating the dissipation by evaporation of fuel for an internal combustion engine, of the type including an enclosure connected to the engine fuel tank and containing an absorbent medium effective to absorb evaporating fuel and means for admitting air, at substantially atmospheric pressure, to the enclosure to purge the medium of evaporated fuel, improved purge control means, for directing a flow of purge air admixed with evaporated fuel to the intake manifold of an internal combustion engine having a fresh fuel-air mixture supplied thereto through a carburetor including a venturi section and a throttle valve between the venturi section and the intake manifold, said purge control means comprising, in combination, a purge control valve including a casing and a flexible diaphragm dividing said casing into first and second chambers, means connecting said first chamber directly to only said venturi section for applying only the negative pressure of said venturi section, due to opening of said throttle valve and running of said engine, to a first surface of said diaphragm exposed to the pressure in said first chamber; a purge air inlet in said second chamber; conduit means engaged in said purge air inlet and directly connected to said enclosure for supply of purge air admixed with evaporated fuel to said second chamber; an outlet in said second chamber; means directly connecting said outlet to said intake-manifold downstream of said throttle valve in the direction of flow from said carburetor to said intake manifold, said outlet being formed as a venturi section defining an apertured valve seat; and a valve element in said second chamber connected fixedly to said diaphragm for conjoint movement therewith with respect to said apertured valve seat to control the flow area through said valve seat to control flow from said purge air inlet past said valve element through said outlet to said intake manifold in accordance with displacement of said diaphragm conjointly with said valve element; whereby said first surface of said diaphragm, in said first chamber, is subjected to the negative pressure of said carburetor venturi section effective in said first chamber, and a second surface of said disphragm, in said second chamber, is subjected to substantially atmospheric pressure, effective in said second chamber through said purge air inlet, as varied by the negative pressure in said intake manifold, effective in said second chamber through said outlet during running of said engine, so that, responsive to the negative pressure in said carburetor venturi section, upon starting of the engine with the pressure in said second chamber being substantially atmospheric, said valve element is moved in an opening direction and, during running of the engine, with the negative pressure of said carburetor venturi section remaining constant, said valve element is moved in a throttling direction with respect to said apertured valve seat responsive to an increase in the negative pressure in said intake manifold reducing the effective positive pressure in said second chamber, and, with the negative pressure in said intake manifold remaining constant, said valve element is moved in an opening direction with respect to said apertured valve seat responsive to an increase in the negative pressure in said intake manifold due to increase in the opening of said throttle valve; whereby the flow rate of the purge air past said valve element through said outlet directly to said intake manifold, during running of the engine, is maintained proportional to the opening of said throttle valve and thus to the flow rate of fresh fuel and intake air through said carburetor.

2. Improved control means, as claimed in claim 1, wherein said valve element is a needle valve extending into said valve seat.

3. Improved control means, as claimed in claim 2, including a spring in said first chamber engaged with said first surface of said diaphragm and acting to move said needle valve in a closing direction.

* * * * *